United States Patent [19]
Price

[11] Patent Number: 6,021,799
[45] Date of Patent: Feb. 8, 2000

[54] AIR REGULATOR CONTROL SYSTEM FOR POWDER COATING OPERATION

[75] Inventor: Richard P. Price, Parma Heights, Ohio

[73] Assignee: Nordson Corporation, Westlake, Ohio

[21] Appl. No.: 09/252,069

[22] Filed: Feb. 17, 1999

Related U.S. Application Data

[62] Division of application No. 08/206,597, Mar. 3, 1994, Pat. No. 5,957,393.

[51] Int. Cl.[7] .......................... G05D 16/02; G05D 16/20
[52] U.S. Cl. .................... 137/102; 137/487.5; 137/552.7
[58] Field of Search ................................... 137/102, 103, 137/487.5, 552.7

[56] References Cited

U.S. PATENT DOCUMENTS

| | | |
|---|---|---|
| 3,705,333 | 12/1972 | Galetto et al. . |
| 3,952,759 | 4/1976 | Ottenstein ............................. 137/487.5 |
| 4,253,480 | 3/1981 | Kessel et al. ............................ 137/102 |
| 4,284,032 | 8/1981 | Moos et al. . |
| 4,361,164 | 11/1982 | Sakakibara et al. . |
| 4,369,401 | 1/1983 | Fayfield et al. . |
| 4,394,871 | 7/1983 | Czajka et al. ......................... 137/487.5 |
| 4,456,038 | 6/1984 | Gwaltney ................................ 137/102 |
| 4,481,967 | 11/1984 | Frick . |
| 4,502,003 | 2/1985 | Frick . |
| 4,640,310 | 2/1987 | Hartle et al. . |
| 4,641,683 | 2/1987 | Mürner . |
| 4,705,067 | 11/1987 | Coffee . |
| 4,766,921 | 8/1988 | Williams . |
| 4,777,383 | 10/1988 | Waller et al. . |
| 4,901,758 | 2/1990 | Cook et al. . |
| 4,961,441 | 10/1990 | Salter ................................... 137/487.5 |
| 4,984,602 | 1/1991 | Saito et al. . |
| 5,020,564 | 6/1991 | Thoman et al. . |
| 5,282,722 | 2/1994 | Beatty . |

FOREIGN PATENT DOCUMENTS

| | | |
|---|---|---|
| 0014369A1 | 1/1980 | European Pat. Off. . |
| 0180999A3 | 5/1986 | European Pat. Off. . |
| 2181278A | 4/1987 | United Kingdom . |
| WO91/00562 | 1/1991 | WIPO . |

OTHER PUBLICATIONS

PXP Specifications; Advanced Control Technologies, Inc.
Pulse Width Modulator Control Circuit; Cherry Semiconductor.
Proportional Electropneumatic Transducer; Mamac Systems; Hydramation, Inc., 1988.
Electro–Pneumatic Pressure Control Products Catalog; Parker Pneutronics, 1987.

*Primary Examiner*—Stephen M. Hepperle
*Attorney, Agent, or Firm*—Calfee, Halter & Griswold LLP

[57] ABSTRACT

An air regulator system for a powder coating system and method of operating the system whereby air regulators constructed with inexpensive, on-off servo control valves are positioned side by side and secured to a common bracket and are operated with a pulse width modulating circuitry that quickly and accurately controls the regulator. The circuitry is carried on a circuit board which is also mounted to the common bracket.

12 Claims, 8 Drawing Sheets

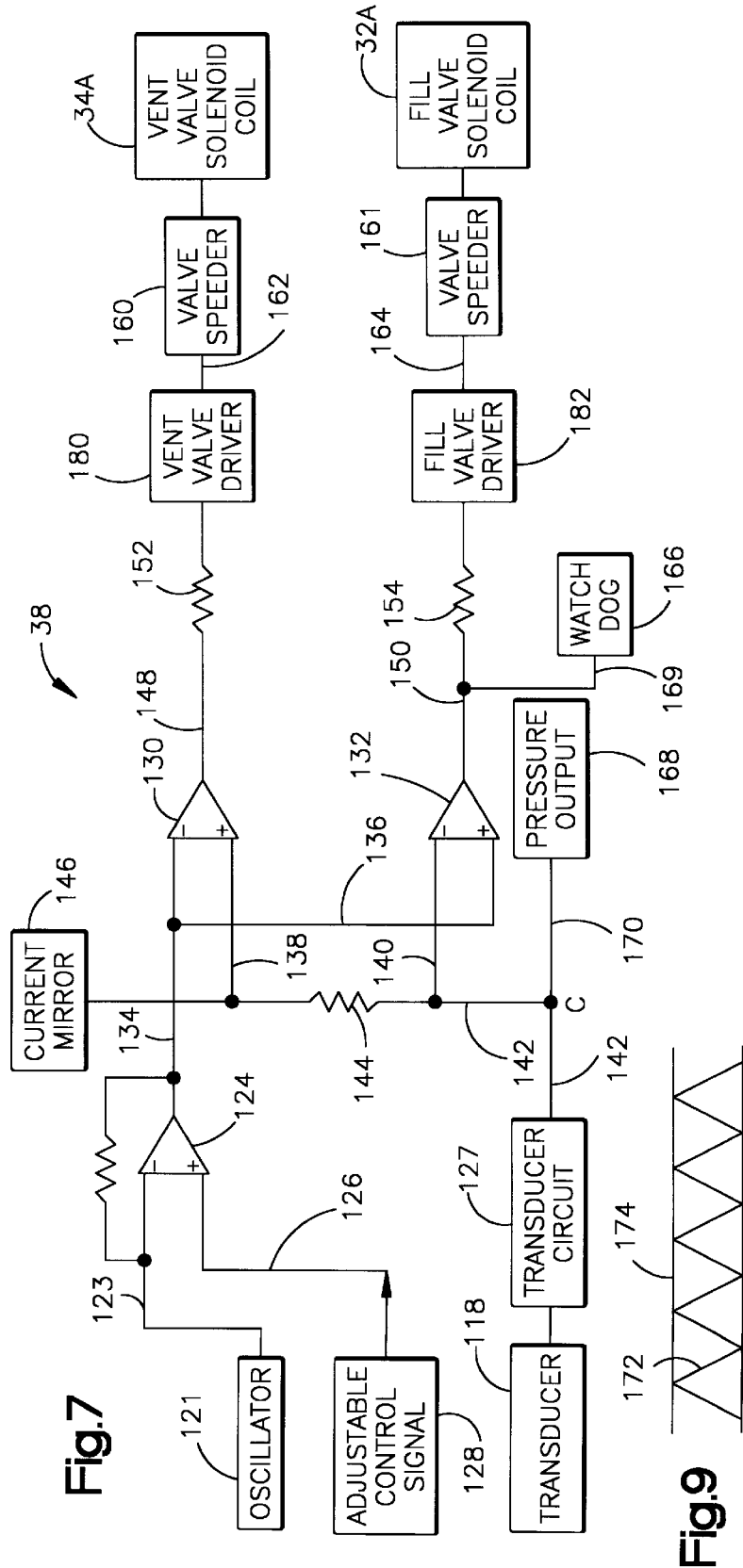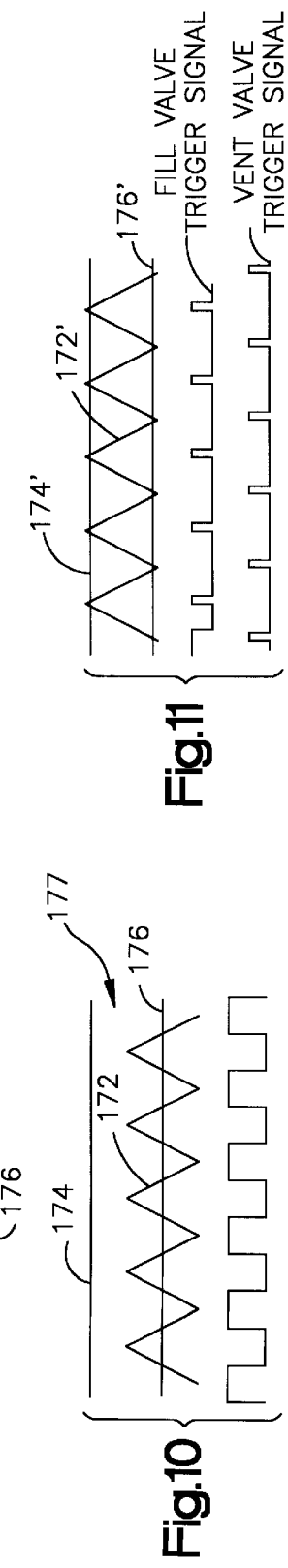

AIR REGULATOR CONTROL SYSTEM FOR POWDER COATING OPERATION

This patent application is a Division of Ser. No. 08/206,597 filed Mar. 3, 1994, titled "Air Regulator Control System for Powder Coating Operation", now U.S. Pat. No. 5,957,393.

This invention relates to the field of remote control, air regulator systems and more particularly to such systems and the method of operating the systems for regulating one or more air streams used in operating a powder coating system.

BACKGROUND OF THE INVENTION

There are numerous systems in which a plurality of air streams are employed in operating the system. For example, a number of different air streams are used in operating a powder coating system. Typically, powder coating systems include a powder pump for transporting air entrained powder through a pneumatic conveyor line to a powder spray gun. Within the powder pump there is a low pressure venturi pumping chamber. This chamber is intersected by a flow air, or ejector air, passage which creates the low pressure condition in the venturi pumping chamber to transport the powder through the pump, and by a powder supply passage through which powder is supplied (i.e., sucked) through a suction tube extending from the pump into a fluidized bed of powder within a powder supply hopper. The powder within the hopper is fluidized by fluidizing air supplied to an air plenum located below a fluidizing plate at the bottom of the hopper. In order to meter or control the rate of powder flow from the fluidized bed into the venturi pumping chamber, the powder pump usually includes a diffusing or atomizing air stream which injects a controlled flow of air into the powder supply passage. This diffuser air flow controls the amount of air which is mixed with the powder entering the venturi chamber to adjust the powder/air mixture being transported through the pump.

A powder spray system can thus incorporate three separate, controlled air streams for operating the system, namely, the fluidizing air stream, the diffusing air stream, and the flow air stream. Each of these three air streams can operate independently at different pressures. At the same time, these three air streams interact together to determine the powder flow rate of powder supplied to the powder coating gun. The pressures of the air streams are individually adjusted to compensate for such factors as the type of powder being sprayed, the product being coated, the type of gun being used, the position of the gun relative to the product, and the like. It is, therefore, important that the air pressure for each of these air streams be capable of variation to independently adjust each of the air flow rates.

One way used to control the air stream pressure values in an electrostatic powder system has been to put a manually operated valve or pressure regulator in each of the air flow lines to independently set the air pressures for each of the different air streams. Use of manually operated, air stream controls has a number of drawbacks, foremost of which is the fact that they cannot be used in a system which is to be fully automated. An operator must consequently be present to manually set or adjust each of the various regulators.

Another problem with controlling pneumatic systems, regardless of the method of control, is cost. The most desirable place for a control device is at a point where the pressure regulation is needed. This, however, means that a separate control device must be positioned at every point of pressure operation. Effective control of a pneumatic circuit of this type thus requires a large number of controllers. Unless the cost of the controllers is relatively low, such a system becomes uneconomical. Thus, although the solutions to the problems described might be possible using the available expensive pressure regulators, such an approach is undesirable because of the high cost of the currently available equipment.

One particular system control problem is the response time to a signalled or desired pressure change. Generally, it is necessary to have a fast response time so that a desired pressure change will occur quickly. However, in pressure regulators with both venting and pressuring valves, a fast response requires a large "dead band" between the operation of the valves to prevent uncontrolled oscillation of the two valves. Thus, the fast response time prevents fine control because the larger the dead band the less control, since no changes occur in the system whenever it is operating within the dead band. While a variable orifice valve could be used to provide both fine control and fast response, such valves are expensive and the equipment to adjust these valves is also expensive.

One conventional air regulator typically incorporates a piloted air pressure control chamber adjusted by one or more on-off solenoid valves. The solenoid valves are switched on and off by an electronic feedback circuit which compares an electric control voltage which is representative of the desired output air pressure, with an electric feedback voltage derived from a pressure transducer which senses the actual output pressure of the regulator. With reference to FIG. 1., the pilot air "vent" or "fill" solenoid valves 10 and 12 can be directly controlled by a dual amplifier "window comparator" circuit 14. Circuit 14 compares a control voltage signal corresponding to a desired output air pressure with a pressure feedback signal voltage corresponding to a measured output air pressure and thereby determines whether the pilot air vent or fill valves 10 or 12 should be energized to maintain the output pressure at a desired value. A circuit in box "A" provides a slight separation between feedback voltages applied to comparators 16 and 18. The separation is achieved by a constant current regulator which maintains a fixed millivolt (mV) voltage drop, i.e., about 100 mV, between inputs to comparators 16 and 18. This effectively causes some pressure hysteresis, as illustrated in the control voltage versus output pressure graph of FIG. 2. This separation has been found desirable to improve control stability and reduce the tendency for both solenoid valves 10 and 12 to chatter due to inherent circuit noise and slight pressure overshoots which occur when control settings are changed.

The problem with the prior art system designs, of the type illustrated in FIG. 1, is that with inexpensive, "on-off" or so called "bang-bang" servo control valves, a somewhat jerky or step wise pressure increase or decrease is experienced when the control settings are changed. This stepwise pressure change is illustrated in FIG. 3 which represents a magnified trace of a section of the control voltage versus output pressure line of FIG. 2. The steps are attributable to the combined effects of Operation Amplifier (Op Amp) input hysteresis and overall electrical and mechanical response times of solenoid valves and regulator mechanical elements. The steps are undesirable because they reduce the stability and can initiate unstable oscillation of pressure about a desired set point. Steps are particularly noticeable if the volume of the pilot air pressure control chamber is reduced to improve system response time.

In view of the foregoing, there is a need for a remote control air regulator system capable of quickly and accurately regulating a plurality of air streams in an industrial process such as a powder coating operation with low cost remote controlled air regulators constructed with inexpensive, "on-off" servo control valves.

OBJECTS AND SUMMARY OF THE INVENTION

It is an object of the present invention to provide a remote control air regulator system and method of operating the system which obviates the problems and limitations of the prior art systems.

It is a further object of the present invention to provide a remote control air regulator system and method of operating the system whereby remote controlled air regulators constructed with inexpensive, on-off servo control valves can quickly and accurately control the air flows in a pneumatic system.

Yet another object is to provide a remote control, air regulator system and method of operating the system whereby stepwise pressure changes at the output of the regulator are substantially reduced.

Still another object is to provide a remote control air regulator system and method of operating the system which provide enhanced resolution, improved accuracy, improved setability and improved dynamic stability of the regulator which is of particular benefit when used to control air flows in powder coating operations.

A still further object is to provide an efficiently packaged grouping of regulators which can be mounted side by side to a common bracket, and which are controlled by pulse width modulation circuitry housed on a circuit board also mounted to the bracket.

In accordance with the invention, there is provided a system and method for controlling a pilot operated, air regulator with a pulse width modulating circuit. The air regulator has an on-off, solenoid controlled, fill valve connected to a source of pressurized control air. When the fill valve opens, the control air enters the pressure control chamber of the regulator and increases the pressure in the chamber until the fill valve closes again. An increase in pressure in the control chamber causes the regulator valve restriction to open to a greater extent which increases the air flow through the regulator and the output pressure at the outlet port of the regulator. An on-off, solenoid controlled, vent valve is used to exhaust the pressurized control air from the control chamber for so long as the vent valve is open which reduces the pressure in the control chamber causing the regulator valve restriction to close down to a greater extent which decreases the air flow through the air regulator and decreases the pressure at the outlet port of the regulator.

A transducer generates a feedback signal proportional to the pressure of the air in the outlet port of the air regulator. A control signal is generated corresponding to a desired pressure at the outlet pressure port of the air regulator. An oscillator generates a fixed frequency oscillating signal which is offset by the control signal to generate an offset oscillating signal. The fixed frequency oscillating signal is preferably a triangular wave having a frequency of between about 100 Hz and 200 Hz. The feedback signal is compared with the offset oscillating signal to generate a vent trigger control signal to open the vent valve whenever the offset oscillating signal exceeds the feedback signal, and to generate a fill trigger control signal to open the fill valve on whenever the offset oscillating signal is less than the feedback signal.

An important aspect of the invention is the provision of a dead band to prevent the vent and fill valves from opening at the same time. The feedback signal is compared with the offset oscillating signal by a circuit in which the offset oscillating signal and the feedback signal are each input into a fill comparator and a vent comparator. A dead band is created between the feedback signal input to the vent comparator and the feedback signal input to the fill comparator to prevent the fill and vent valves from opening at the same time.

Also in accordance with the invention, a speeder circuit is provided to momentarily increase the response time of the fill and vent valves. In addition, an alarm can be activated in response to the vent and/or fill trigger control signals to detect any malfunction of the mechanical valve components.

In accordance with the invention, a system and method is disclosed for controlling a vent valve and a fill valve of a air regulator. The system includes a transducer for generating a feedback signal proportional to the pressure of the outlet port of the regulator. A control signal corresponding to a desired pressure at the outlet port is provided. An oscillator generates a fixed frequency oscillating signal which is offset by the control signal to generate an offset oscillating reference signal. A signal envelope is generated having an upper, or fill, threshold value equal to the feedback signal and a lower or vent, threshold value equal to the feedback signal less a predetermined hysteresis, or dead band, voltage value. Once the desired output pressure has been set, the feedback signal window, or envelope, floats up and down relative to the reference signal as the pressure at the output of the regulator varies. If a different output pressure is desired the reference signal is adjusted by adjusting the amount by which it is offset. The feedback signal window is constantly compared with the offset oscillating reference signal for generating a fill trigger control signal to open the fill valve whenever the feedback signal window drops below the oscillating reference signal. Further, the feedback signal window is constantly compared with the oscillating reference signal for generating a vent trigger control signal to open the vent valve whenever the feedback signal windows rises above the offset oscillating signal.

In accordance with one embodiment of the invention, the size of the dead band, or hysteresis range between the fill threshhold value and the vent threshhold value is set to be approximately equal to the amplitude of the fixed frequency oscillating signal. In a second embodiment of the invention, the dead band range is set to be smaller than the amplitude of the fixed frequency oscillating signal.

In accordance with the invention, a control device for outputting accurately controlled pressurized air to operate at least one air operated device comprises a pressure regulator having an inlet supply port connected to a source of pressurized air, an outlet pressure port connected to the air operated mechanism, and structure for regulating flow of the pressurized air from the inlet port to the outlet port whereby the pressure of the pressurized air at the outlet port is accurately controlled.

According to the invention, the regulating structure includes a pilot air control section having a piston component for opening and closing a regulator valve which controls the flow of pressurized air from the inlet port to the outlet port. A fill valve connected to a source of pressurized control air admits air into the pressure control chamber of the regulator to move the piston means to open the regulator valve and increase the air pressure at the outlet port. A vent valve communicating with the pressure control chamber, bleeds air out of the chamber to move the piston component to close off the regulator valve and decrease the air pressure at the outlet pressure port. A circuit control structure outputs trigger signals to operate the fill valve and the vent valve in response to a reference signal input corresponding to a desired pressure at the outlet pressure port and a feedback signal corresponding to the pressure in the outlet pressure port. The circuit, in response to the signal inputs, causes the vent valve and the fill valve to open and close in accordance with a pulse width modulation, variable duty cycle control. The pulse width modulation, variable duty cycle control operates so that whenever the pressure in the outlet pressure port is below the desired value, the feedback signal window drops down with respect to the offset oscillating reference signal, and pressurized control air from the fill valve opens the regulator valve to increase the outlet pressure. Conversely, whenever the pressure in the outlet pressure port is above the desired value, the feedback signal window rises with respect to the offset oscillating reference signal and the vent valve opens to close the regulator valve and reduce the pressure at the outlet pressure port. The effect is to maintain a substantially constant pressure.

Also, the pressure regulator can be constructed with two or more outlet control pressure ports and means for regulating flow of the pressurized air from the inlet supply port to the two or more outlet pressure ports whereby the pressure of the pressurized air at each of the outlet ports is independently and accurately controlled. In this embodiment, the pressure regulator has two or more means for regulating, each of which means has pilot air control of a fill valve and a vent valve in accordance with the foregoing description. By constructing the regulator in this way as a multichannel regulator further cost savings can be realized as compared to prior art devices.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 7 is. a schematic illustration of an electronic air regulator control circuit in accordance with the present invention;

FIG. 9 is an offset oscillating reference signal whose peak to peak voltage extends between the fill trigger signal value and the vent trigger signal value of the feedback signal window showing the regulator valve in a balanced condition;

FIG. 10 shows the upward shift of the feedback signal window due to an increase in the output pressure and the corresponding opening and closing cycle of the vent valve;

FIG. 11 shows an offset oscillating signal whose peak to peak voltage extends slightly above the fill trigger signal value and slightly below the vent trigger signal value of a regulator valve in a balanced condition and the corresponding opening and closing cycle of the fill and vent valves;

DETAILED DESCRIPTION OF THE INVENTION

Figure 4:
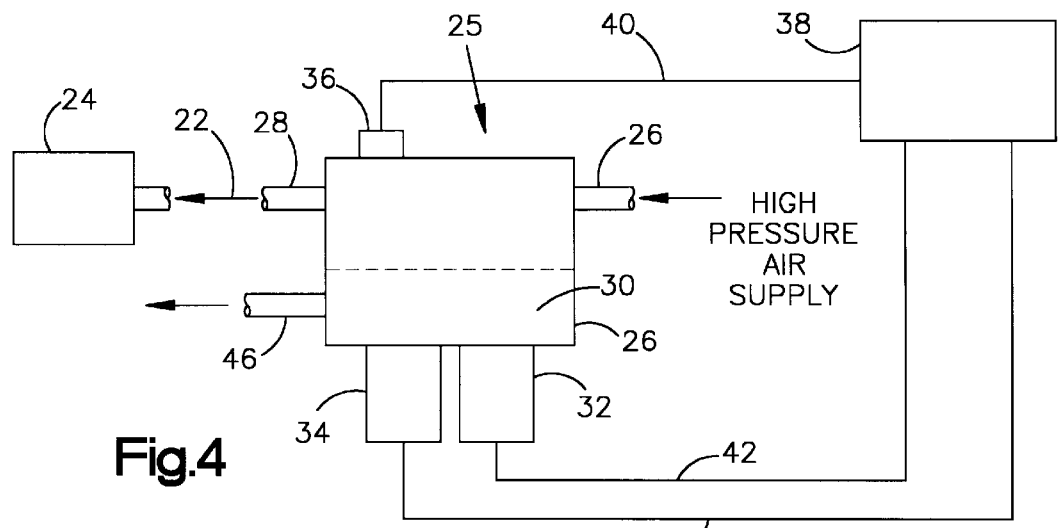
FIG. 4 is schematic drawing of an electronic air regulator control system, in accordance with the present invention.

Referring to FIG. 4, an electronic air regulator control system 20, intended for regulating one or more air streams 22 used to operate a powder coating system 24, is illustrated. System 20 includes an air regulator 25 having at least one high pressure air input line 26 and a regulated pressure outlet line 28 that directs pressure regulated air to powder coating system 24. Air regulator 25 includes a pilot air control section 30 operated by fill and vent, on-off solenoid valves 32 and 34. A transducer 36 monitors the pressure regulated air output pressure being directed into outlet line 28 and generates a transducer signal which is input into an air regulator control circuit 38 through a line 40. Control circuit 38 compares the transducer signal with a preset pressure signal corresponding to a desired output pressure, and when appropriate, inputs a solenoid activating signal through either line 42 or 44 to on-off solenoid valves 32 and 34, respectively, for controlling the pilot air control section 30. A vent line 46 is connected to pilot air control section 30 to vent excess control air to atmosphere.

Figure 5:
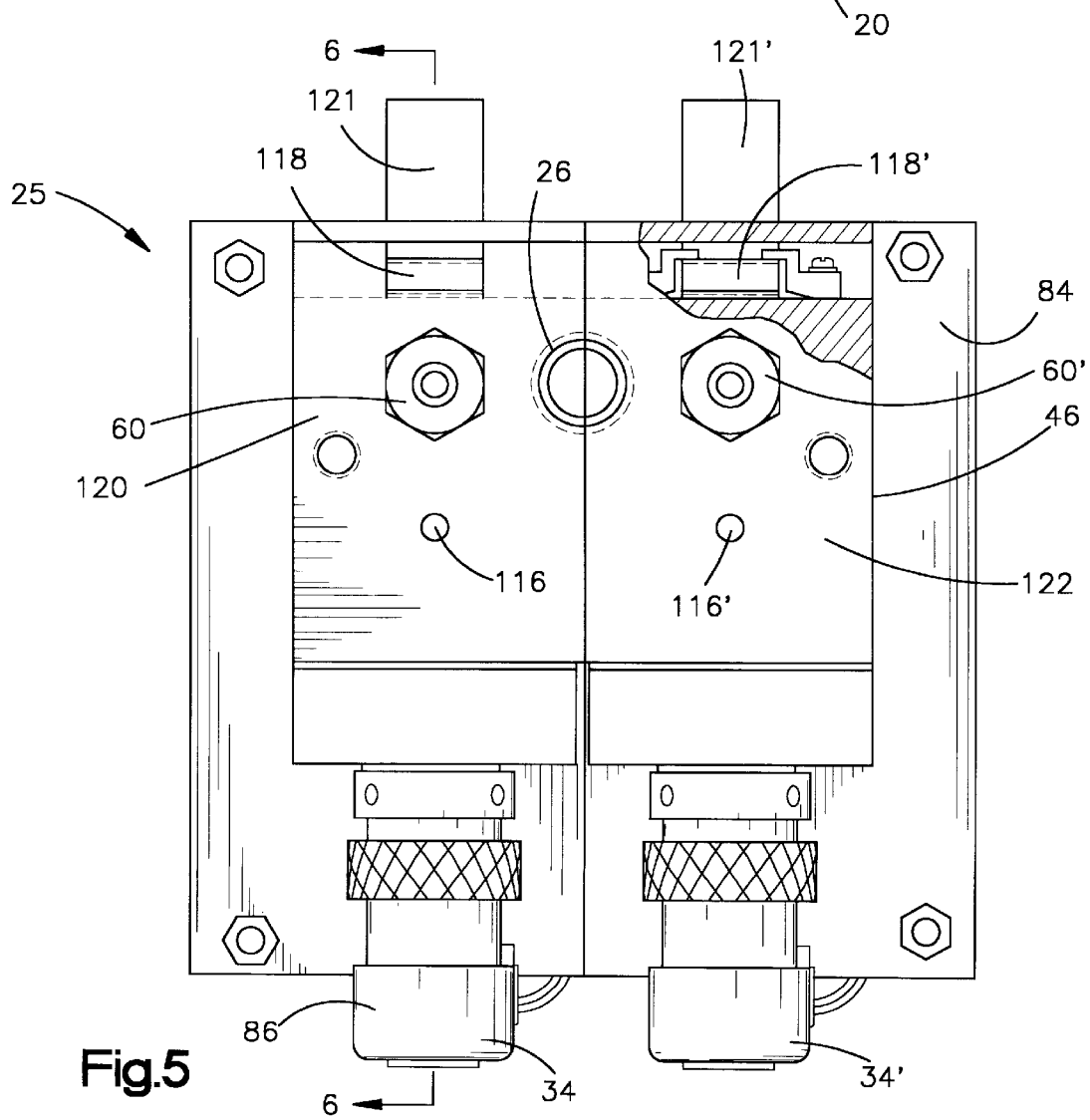
FIG. 5 is a front view of a pressure regulator, in accordance with the present invention.
Figure 6:
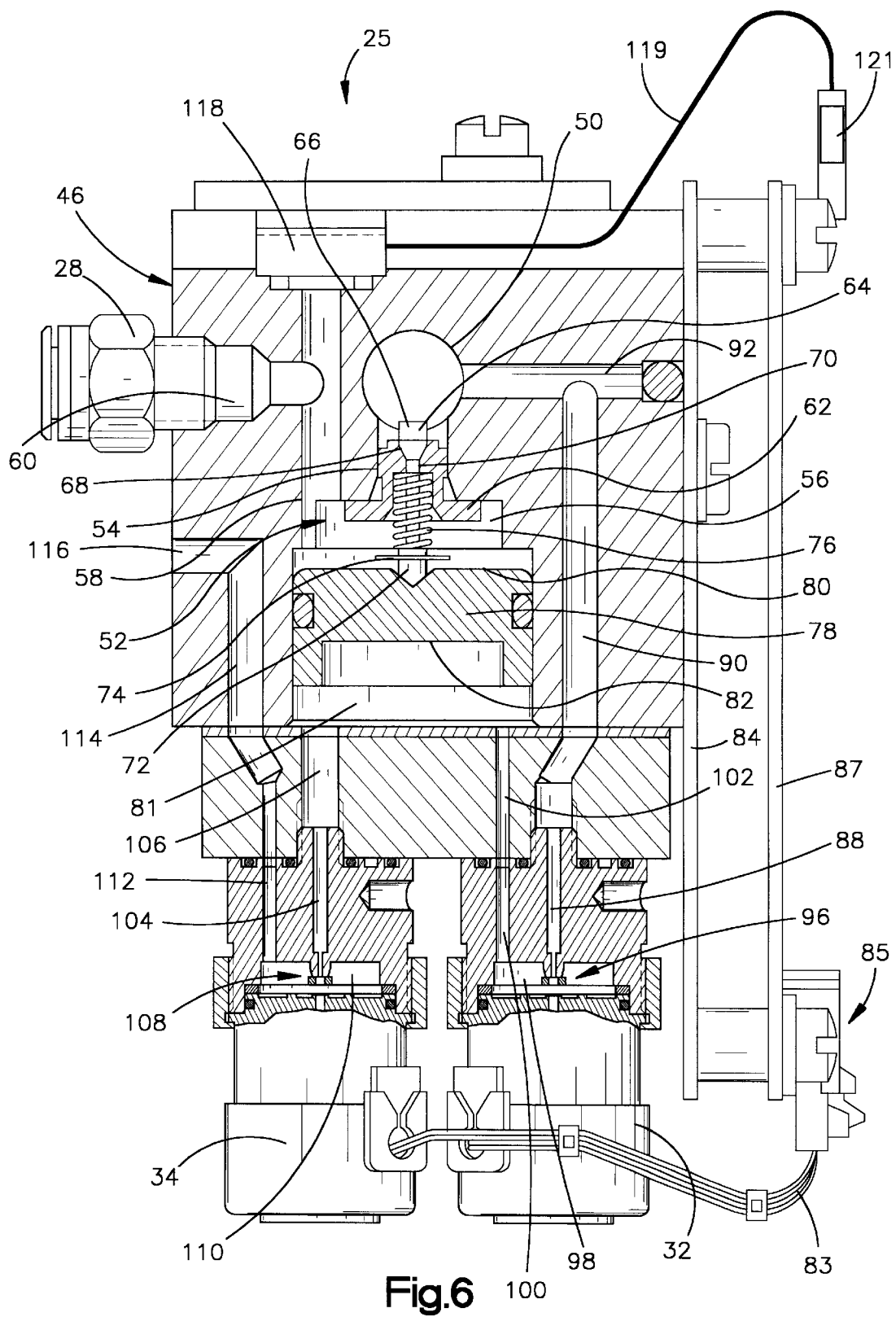
FIG. 6 is a view, in cross section, taken along line 6—6 in FIG. 5.

A principle feature of this invention is the construction of regulator 25, as illustrated in FIGS. 5 and 6. Regulator 25 includes a rectangular housing 46 having a high pressure air inlet 26 connected to an air passageway 50 extending along the width of casing 46. A valve and seat assembly 52 is disposed in a bore 54 provided between air passageway 50 and an enlarged pressure regulated chamber 56. A bore 58 connects pressure chamber 56 with an outlet port connected to regulated pressure outlet line 28.

Valve and seat assembly 52 include a valve seat 62 securely mounted within bore 54. A pintle valve 64 has an enlarged head 66 which is adapted to seat against the upper end 68 of valve seat 62 and a stem 70 secured at one end to head 66 and to an end cap 72 at the other end. A ring 74 is secured to end cap 72 to engage one end of a compression spring 76 which is abutted at the other end against valve seat 62 to bias enlarged head 66 of valve 64 against the upper end 68 of valve seat 62. In this way, the valve is biased to the closed position.

A piston 78, which is slidably received in enlarged regulated pressure chamber 56, has a indentation on its upwardly facing surface 80 adapted to receive end cap 72. The regulated pressurized air is contained within a regulated pressurized air chamber 56 above upwardly facing surface 80 of piston operator 78. Pressurized control air is contained within a pressure control chamber 81 of pressure chamber 56 below downwardly facing surface 82 of piston operator 78. The pressurized control air in chamber 81 in conjunction with spring 76 move piston operator 78 and pintle valve 64 so that the pressurized air flowing across valve and seat assembly 52 is regulated, as discussed in detail below.

The movement of piston 78 is controlled by fill and vent valves 32 and 34, respectively, which are secured to casing 46 and are in flow communication with the pressure control chamber 81. Valves 32, 34 are conventional on-off servo control valves by which are operated by solenoids. The solenoids are connected by wires 83 to an electrical connector 85 for a circuit board 87 which carries the electrical circuits shown in FIGS. 7, 8A, and 8B. Circuit board 87 is secured to a bracket 84 which is mounted to regulator housing 46.

Fill valve 32 has a high pressure, inlet passage 88 which is connected to a passage 90 in regulator 25. Passage 90, in turn, is connected to air passageway 50 by connecting passage 92. Fill valve 32 also has an on-off valve 96 at one end of inlet passage 88. A chamber 98 disposed about valve assembly 96 is connected by a high pressure outlet passage 100 and a control pressure inlet passage 102 to chamber 81 in regulator casing 25. When valve 96 opens and closes, high pressure air flows from air passageway 50 to chamber 81 causing piston 78 to move upwards against the bias of spring 76 to open pintle valve 64. Solenoid valves 32, 34 are Model P/N CS-986-1 solenoid valves manufactured by Clippard Instrument Lab, Inc. of Cincinnati, Ohio.

Vent valve 34 has an inlet vent passage 104 connected at one end by an outlet passage 106 to chamber 81 in regulator casing 25. The other end of vent passage 104 has an on-off valve 108 which controls the venting of chamber 81 to a chamber 110 disposed about valve assembly 108. A vent passage 112 in valve 34 is connected via a vent passage 114 in regulator casing 25 to a vent port 116. As illustrated in FIG. 4, vent port 116 can have a vent line 46 to vent the air to a specific location. By opening and closing vent valve 108, control air from chamber 81 is vented through vent passageway 106 and passageway 104 into chamber 110 so that spring 76 can move valve and seat assembly 52 and piston 78 downwardly in FIG. 6 to close off pintle valve 64.

In operation, when the pressure at outlet port 60 is below a desired value, fill valve 32 opens and high pressure air is fed into chamber 81 whereby piston 78 moves upwards along with valve 64. With an increased flow of high pressure air across valve 64, the pressure at outlet port 60 increases. When the pressure at outlet port 60 has increased to the desired value, fill valve 32 closes. If the pressure at outlet port 60 rises above the desired value, vent valve 34 opens and high pressure air is vented from chamber 81 through vent port 116 causing piston 78 to move downwards so that valve 64 begins to close. As the valve 64 closes down, the flow of high pressure air across valve 64 decreases and the pressure at outlet port 60 decreases. When the pressure reaches the desired value, vent valve 34 closes.

A pressure transducer 118 is mounted to housing 46 to monitor the pressure at outlet port 60. Transducer 118 is a Model P/N SCC-100D transducer manufactured by SenSym of Milpitas, Calif. The pressure feedback signals from transducer 118 are directed through line 119 to a connector 121 affixed to the upper end of circuit board 87. The feedback signals are input from connector 121 into regulator control circuit 38 carried on circuit board 87, which in turn activates the fill or vent valves 32 and 34, as appropriate, to appropriately adjust valve 64 so that the output pressure at outlet port 60 remains at the desired pressure. Moreover, even with varying supply pressure to regulator 25 and varying output requirements for regulator 25, the closed loop feedback system of the present invention is designed so that such changes are compensated for by the fill and vent valves 32 and 34.

Figure 1:
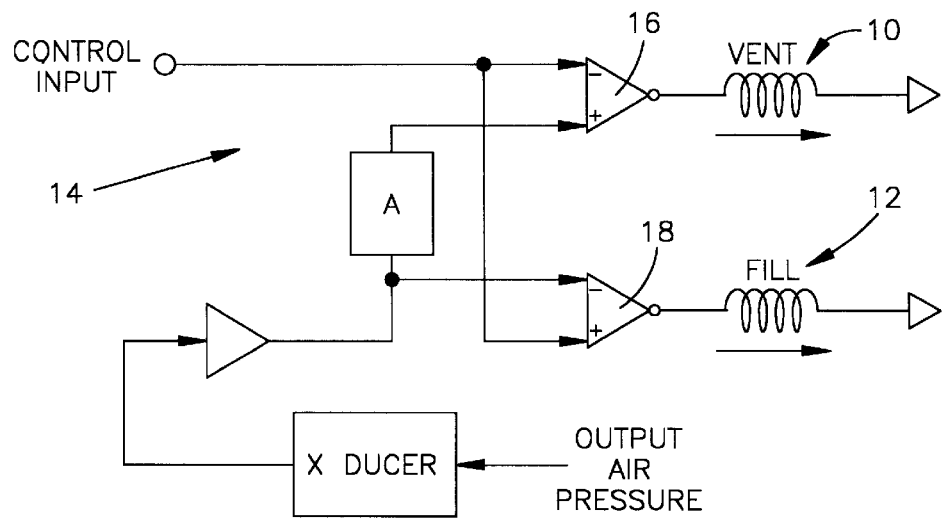
FIG. 1 is a prior art, "window comparator" circuit for controlling pilot air "vent" and "fill" solenoid valves.
Figure 2:
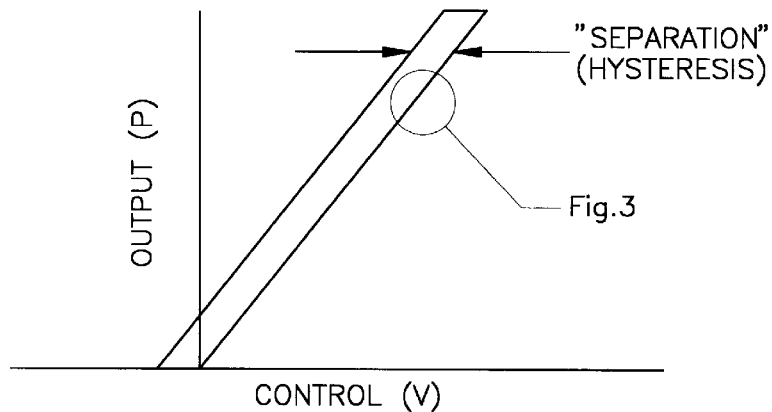
FIG. 2 is a control voltage versus output pressure graph for the circuit illustrated in FIG. 1.
Figure 3:
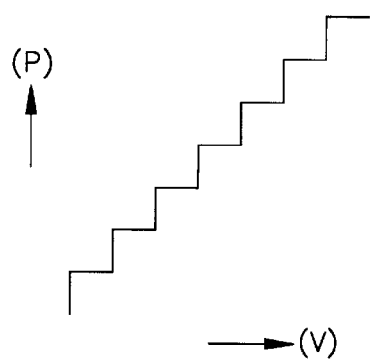
FIG. 3 is a magnified section of the control voltage versus output pressure line illustrated in FIG. 2.

As just discussed, the opening and closing of fill and vent valves 32 and 34 are controlled by control circuit 38 in response to the air pressure sensed at outlet port 60 by transducer 118. As previously explained, if the control circuit is of the type illustrated in FIG. 1, a somewhat jerky or stepwise pressure increase or decrease results whenever the control settings are changed. This effect of a stepwise pressure increase or decrease effect, as illustrated in FIG. 3, is attributable to the combined effects of amplifier input hysteresis and the overall electrical and mechanical response times of the valves 32 and 34 and the mechanical elements of regulator 25. The step shaped pressure change is undesirable because it results in limited regulator stability and can initiate unstable oscillation of output pressure about a desired set point. Stepwise pressure changes are particularly noticeable when the volume of chamber 81 is reduced to improve the response time of system 20.

Another aspect of the invention relates to regulator 25 being constructed so as to deliver two or more streams of regulated air, each at a different pressure. Referring to FIG. 5, regulator 25 is illustrated with two substantially identical sections 120 and 122, each including the regulator elements and structure illustrated in FIG. 6. That is, both sections include vent and fill valves 32, 34 and 34', transducers 118 and 118', vents 116 and 116', etc. Throughout the specification, primed reference numerals represent structural elements which are substantially identical to structural elements represented by the same unprimed reference numerals. A common high pressure air inlet passage 50 can provide pressure regulated air for each valve section 120 and 122. Valve sections 120 and 122 are independently controlled by control circuits 38 and 38' in response to the air pressure sensed at outlet ports 60 and 60' by transducer 118 and 118', respectively, so that the regulated air can be independently supplied at varying pressures from outlet ports 60 and 60'. While two regulator sections 120 and 120' are illustrated, it is within the terms of the present invention to incorporate as many sections as desired.

A principle feature of this invention is the construction of regulator control circuit 38, as illustrated in FIG. 7. Referring to FIG. 7, an oscillator 121 which generates a fixed frequency oscillating signal (preferably a triangular wave) for pulse width modulation, is connected by line 123 to one input of an OP amp 124. The other input of OP amp 124 is connected by line 126 to a means 128 providing an adjustable control signal, such as a variable source of voltage (typically between about 1 to 5 volts), corresponding to a desired pressure at outlet port 60. Given these inputs the output of amplifier 124 will be an offset oscillating signal. For example, if the oscillating signal oscillates within an amplitude of 0.125 volts, and the offset control signal input to amplifier 124 is set at 3.0 volts, then the output signal will oscillate between 3.0 volts and 3.125 volts. In this case the oscillating signal is offset by 3.0 volts. The frequency of this signal could be for example 100 Hz 200 Hz.

This offset oscillating signal is directed into one input of comparators 130 and 132 through lines 134 and 136. The other input to comparators 130 and 132 is connected through lines 138 and 140, respectively, which is connected to a line 142 to a transducer circuit 127. Transducer circuit 127 is in turn connected to transducer 118 which generates the feedback signal corresponding to the pressure at outlet port 60.

A resistor 144 is disposed in line 142 between lines 138 and 140. A current mirror 146 supplies current to resistor 144 to produce a voltage separation between the inputs to comparators 130 and 132. The amount of the separation voltage is determined by the amount of current supplied by current mirror 146. This voltage separation creates a "dead band" range between the vent and fill trigger control signals which are being output into lines 148 and 150 respectively, from comparators 130 and 132, as will later be described in more detail. The dead band voltage separator prevents the vent and fill valves 32 and 34 from opening at the same time as will also be discussed in more detail below.

Lines 148 and 150 include resistors 152 and 154, respectively, and direct the trigger control signals into the solenoid driver 180 of vent valve 34 and the solenoid driver section 182 of fill valve 32. Valve speeder circuits 160 and 161 are connected by lines 162 and 164 to drivers 180, 182, respectively, to momentarily increase the response time of vent valve solenoid coil 34A and fill valve solenoid coil 32A, as discussed in more detail below. A watch dog circuit 166 receives the fill trigger control signal through line 169 which is being directed into fill valve driver 182. Circuit 166 is utilized to activate an alarm device when there is a malfunction in the system, such as vent valve 34 sticking which would cause fill valve 32 to remain open. Finally, a pressure output indicator 168 receives the output signal from transducer circuit 127 through a line 170 to indicate the current output pressure to an operator.

To further appreciate the advantages and advances provided by the present invention, a discussion of its operation follows. Oscillator 121 generates a fixed frequency triangular wave at a frequency in the range of about 100 Hertz (Hz) to about 200 Hz for pulse width modulation control of solenoid drivers 180, 182. The purpose of the pulse width modulation is to operate the solenoid drivers 180, 182 of valves 34, 32 in such a manner that pintle valve 64 is precisely opened or closed as the output pressure of regulator 25 moves towards a preset set point. This is accomplished by modulating, or varying the width or duration of the pulses which cause the valves 32, 34 to open. The pulse width is varied so that when a relatively large difference is present between the set point and the transducer signal, the width or duration of the pulse is relatively large, and conversely when a relatively small difference is present between the set point and the transducer signal, the width of the pulse is small so that the valve opens only very briefly. Thus, as the transducer signal moves closer to the set point, the duty cycle, or duration of the pulse opening the appropriate valve 32 or 34, becomes progressively smaller until the set point is reached. This prevents overshooting of the set point and increases regulator stability.

Referring again back to FIG. 7., amplifier 124 receives the triangle wave from oscillator 121, and an adjustable control signal from control signal means 128 corresponding to a desired pressure, and outputs an offset oscillating signal into line 134, as previously explained. The illustration in FIG. 9 shows the triangularly shaped, offset oscillating signal 172 between an upper line 174 which corresponds to the trigger voltage level for fill driver 182, and a lower line 176 corresponding to the trigger voltage level for vent driver 180. The upper and lower lines 174 and 176 are separated by a dead band or separation voltage of about 100 mV to 200 mV, corresponding to the voltage drop across resistor 144. This voltage separation forms the "dead band" which prevents the fill and vent valves 32 and 34 from operating at the same time, as will become apparent from the following discussion. The fill trigger voltage level 174 and vent trigger voltage level 176 form a feedback signal envelope 177. Assuming that the set point provided by control 128 remains fixed, the offset oscillating signal will also remain fixed in position. As the feedback signal provided by transducer 118 varies with the output pressure of regulator 25, the signal envelope defined by trigger voltage levels 174, 176 will move up or down relative to the oscillating signal 172. The effect of this is to provide pulse width modulation, or a variable duty cycle, for solenoid valves 32 and 34.

When the oscillating signal 172 is positioned between upper line 174 and lower line 176, neither trigger voltage level 174 or 176 is crossed by oscillating signal 172. Therefore, neither of the valves 32, 34 is open and regulator 25 is in a steady state condition, i.e., the output pressure measured by transducer 118 is substantially equal to the desired output pressure at outlet port 60. That is, the output pressure at outlet port 60 has a value corresponding to that set by the adjustable control 128.

FIG. 10, on the other hand, shows regulator 25 in an unstable condition. Here, the pressure at the regulator output has increased causing signal envelope 177 between lines 174 and 176 to move up relative to reference oscillating signal 172. This same effect would result if the output pressure of regulator 25 remained constant, but adjustable control 128 was reset to reduce the amount by which wave 172 was offset and thereby reduce the pressure set point which is desired for the regulator. In both of these cases reference oscillating signal 172 would cross the vent trigger line 176 on each oscillation.

The effect of this movement on vent valve 34, as shown directly below signal 172, is that whenever oscillating signal 172 drops below vent trigger threshold line 176, comparator 130 sends a pulse shaped vent trigger signal to vent valve 34 causing vent valve 34 to open for the duration of the pulse, releasing pressure from pressure control chamber 81 on each pulse to close down valve 52 and reduce the pressure at the output of regulator 25. Conversely, whenever the oscillating reference signal 172 is positioned above a fill trigger threshold line 174, due to either a downward movement by signal envelope 177 to reflect a drop in pressure at output 60, or an upward movement by reference signal 172 to reflect an upward adjustment of the desired pressure set point, comparator 132 sends a pulse shaped fill trigger signal to fill valve 32 causing fill valve 32 to open for the duration of the pulse. This increases pressure in chamber 81 which opens up valve 52 to increase the output pressure of regulator 25.

Significant advantages result from the use of a variable duty cycle, electric control for the solenoid valves 32 and 34. The stepwise pressure changes, as previously discussed, are substantially eliminated, because the regulator moves to the desired set point in a smoother and more controlled fashion, resulting in an improved system stability. Oscillation about a desired pressure set point is also eliminated since the pulse width, or duty cycle, of the vent and fill valve drivers 180, 182 becomes increasingly smaller as the regulator output pressure approaches the desired set point. This prevents overshooting of the set point as previously mentioned. These advantages improve the setability and accuracy of the regulator output pressure.

Moreover, given this greater degree of control over regulator operation, the response time for regulator 25 can be increased by decreasing the volume of cavity 81 without providing regulator instability. Another important advantage of the system is that the common place, relatively inexpensive on-off servo, fill and vent valves 32 and 34, which are used in the present invention, operate nearly as effectively as expensive, complicated, proportional analog servo control valves.

While the present invention is discussed in terms of the peak to peak amplitude of reference triangle wave 172 being equal to the deadband voltage separation between feedback signal envelope limits 174, 176 set by the fixed millivolt drop across resistor 144, it has been found that when the peak to peak amplitude of wave 172 is slightly greater than the fixed millivolt drop, i.e. between about 25 to about 75 millivolts, and preferably about 50 millivolts greater, system 20 in some cases may operate more effectively. This is illustrated in FIG. 11, where oscillating signal 172' is positioned to extend slightly above fill trigger value 174' and slightly below vent trigger value 176'. In this state, both the fill valve 32 and the vent valve 34 cycle on and off for brief periods of time during each cycle of wave 174' as shown directly below oscillating signal 172'. Whenever oscillating signal 172' is below vent trigger 176' a vent valve trigger signal cycles vent valve 34 open and closed for brief periods of time. Between the opening and closing of vent valve 34, oscillating signal 172' projects above fill trigger value 174 and the fill valve trigger control signal shown below signal 172' cycles fill valve 32 open and closed for brief periods of time.

Figure 8A:
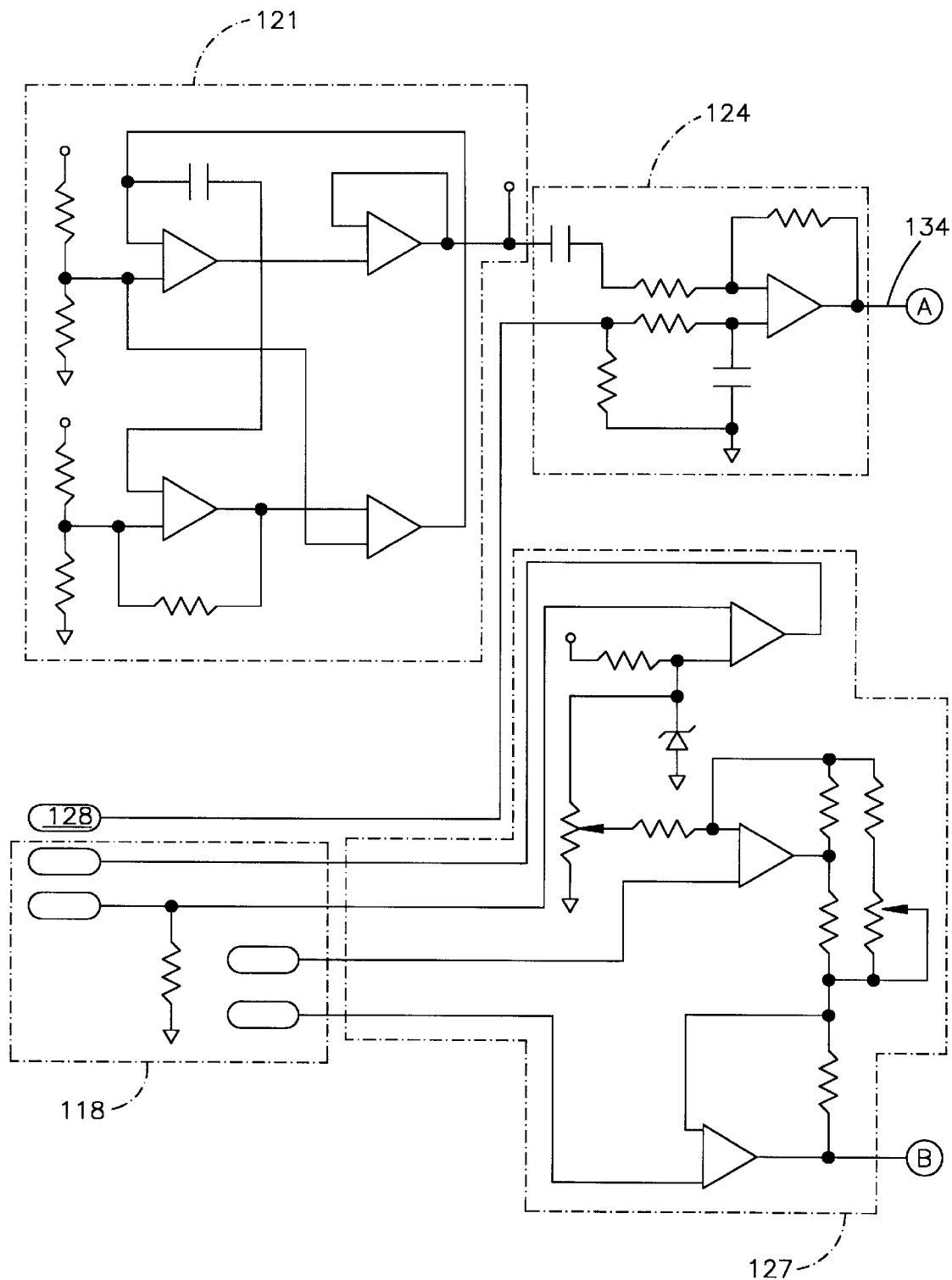
FIGS. 8A and 8B are an electrical schematic diagram of a preferred embodiment of an electronic air regulator control circuit in accordance with the present invention.
Figure 8B:
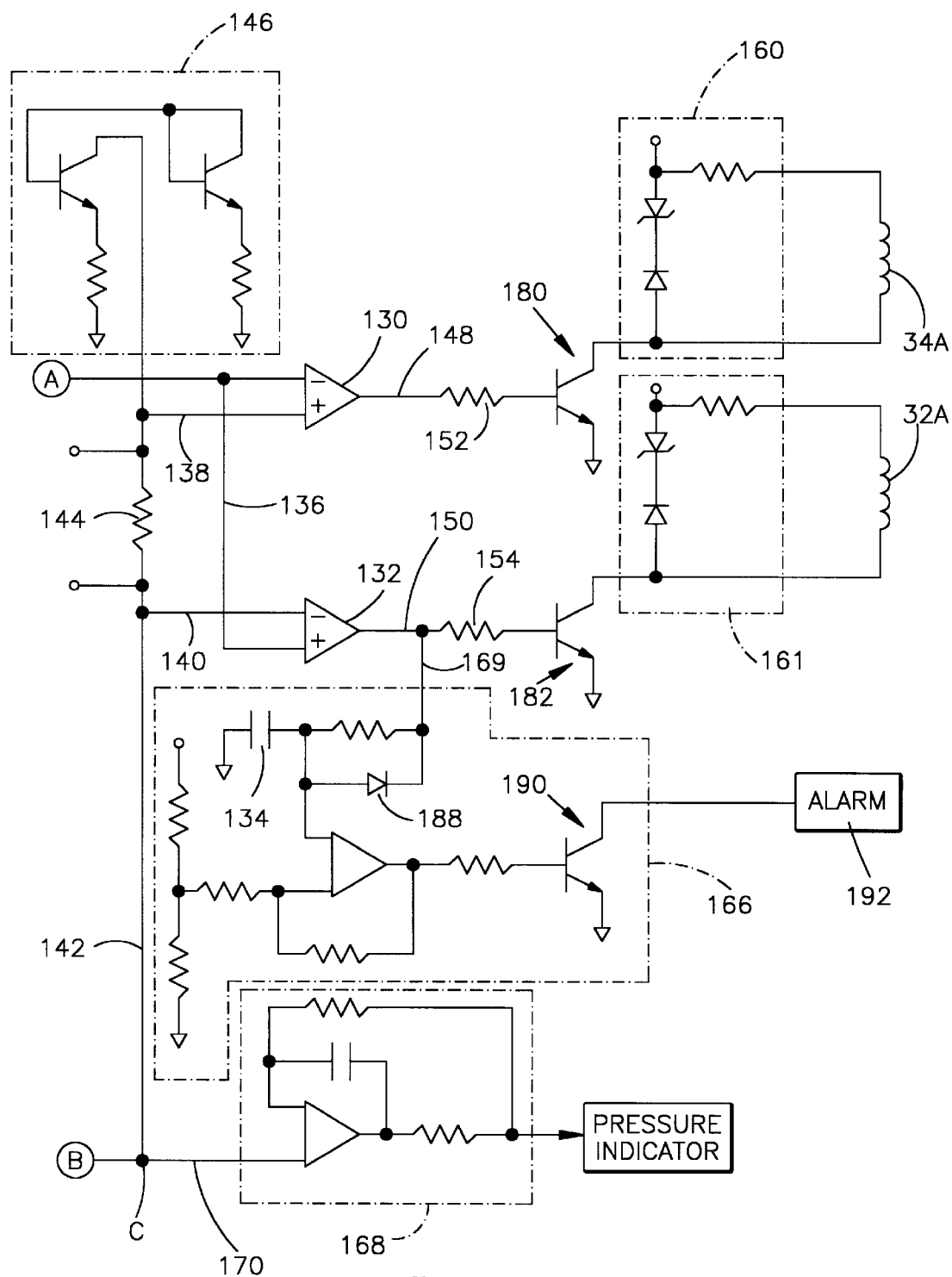

Other features of this invention which are incorporated in the construction of regulator control circuit 38, as illustrated in FIGS. 7, 8A and 8B, are now discussed. Referring to FIG. 8A, a preferred construction of oscillator 121, used to generate a triangle wave, is illustrated. Since the design of oscillator 121 is conventional, the details of its construction are omitted. Circuit 121 is connected through conventional amplifier circuit 124 and lines 134, 136 to comparators 130, 132 (see FIG. 8B).

The output signal from transducer 118 is directed through a conventional transducer circuit 127, as illustrated in FIG. 8A, to a point "C", as illustrated in FIG. 8B. The transducer output signal is then directed through line 170 into a conventional pressure output indicator 168 and into a line 142 connected to the inverting input of fill comparator 132. The transducer output signal in line 142 is also input into the non-inverting input of vent comparator 130 after its voltage is reduced by resistor 144. A conventional, current mirror circuit 146 supplies current through resistor 144 to set the voltage drop across resistor 144. Whenever one of the comparators 130 or 132 sends a trigger signal to its corresponding vent valve 34 or fill valve 32, the signal crosses a resistor 152 or 154 and turns on the associated valve drivers 180 or 182. The output of valve drivers 180, 182, in turn, pass through valve speeder circuits 160, 161, respectively, to energize vent solenoid coil 34A and fill solenoid coil 32A, respectively. Valve speeder circuits 160, 161 generate momentary high voltage spikes to decrease the activation times, or speed up the operation of solenoids 32A, 34A. When vent solenoid coil 34A is energized it opens vent valve assembly 108 of vent valve 34, and when fill solenoid 32A is energized it opens fill valve assembly 96 of fill valve 32.

Finally, a watchdog circuit 166 responds to the fill trigger signal from fill comparator 132 and charges a capacitor 134 with each trigger pulse on line 150. As long as comparator 132 cycles on and off, the system is operating properly and the capacitor 134 discharges through diode 188 between pulses. However, if comparator 132 remains on for too long of a period of time, such as when vent valve 34 is stuck open or the input pressure is too low, capacitor 134 will charge to a high enough level to turn on a transistor 190 and activates an alarm 192.

Figure 12:
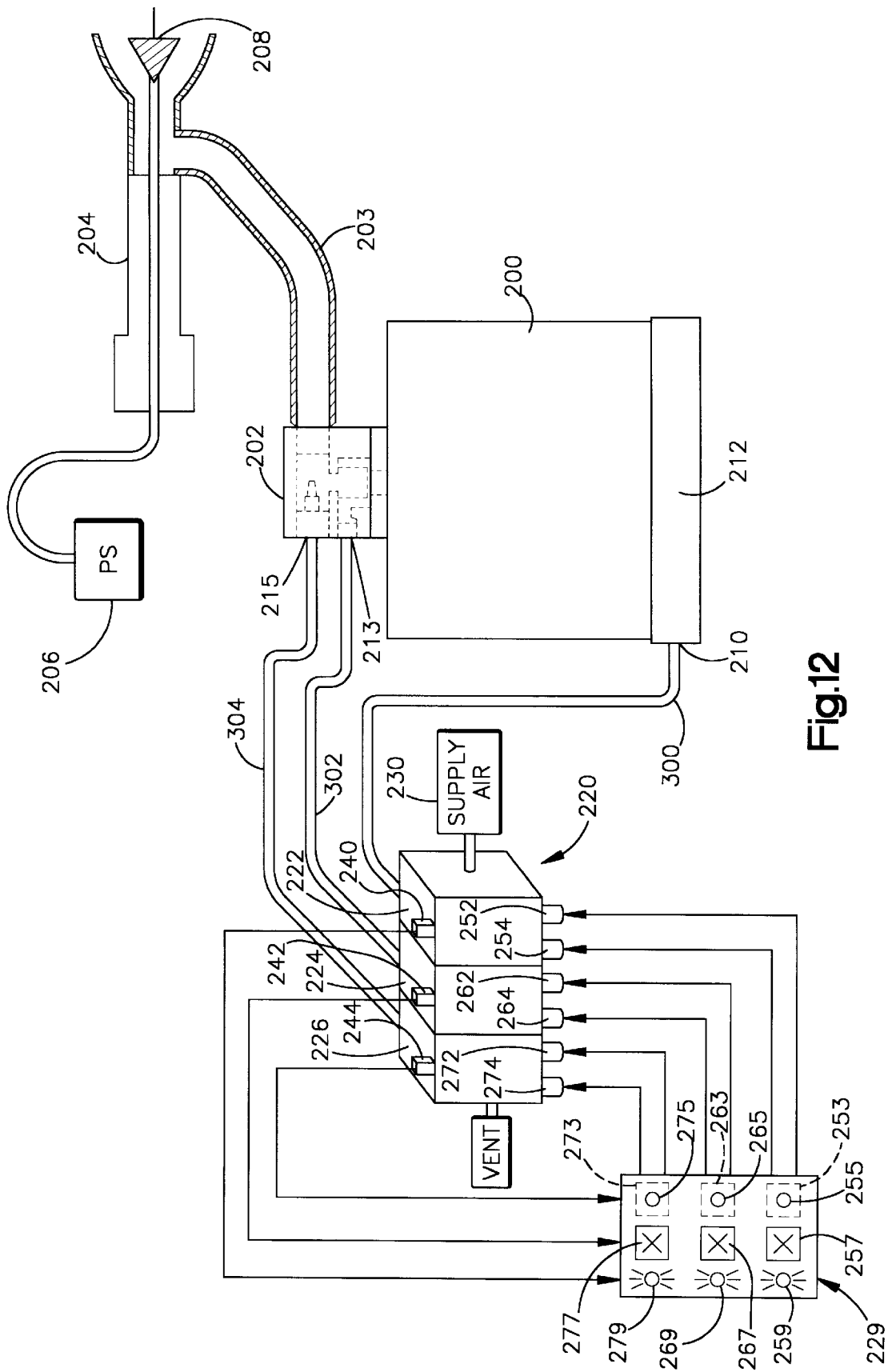
FIG. 12 shows the invention applied in a powder coating system.

While the above description of circuit 25 has been in terms of a single regulator valve, it is also within the terms of the invention to operate a plurality of identical regulator valves which are ganged together. This type of arrangement is shown in FIG. 12 where the invention is applied to a powder coating system. With reference to FIG. 12, a powder supply hopper 200 supplies powder through a pump 202 via a hose 203 to a powder coating gun 204. Hopper 200 could be for example the hopper shown in U.S. Pat. No. 5,018,909 which is hereby incorporated by reference in its entirety.

Pump 202 could be for example the pump shown in U.S. Pat. No. 4,615,649 which is hereby incorporated by reference in its entirety. Gun 204 could be for example the gun shown in U.S. Pat. No. 5,056,720 which is hereby incorporated by reference in its entirety. A power supply 206 supplies a high voltage to a charging electrode 208 to charge the powder sprayed from gun 204 so that it electrostatically adheres to the part (not shown) being coated.

In this system one air pressure setting will be required for the air entering inlet 210 to the fluidizing air plenum 212 which underlies hopper 200. A second air pressure setting will be required for the diffuser air inlet 213 to pump 202. A third air pressure setting will be required for the flow air setting 215 to pump 202.

To accurately provide and control these three pressure settings, a three channel regulator assembly 220 c an be utilized. Regulator assembly 220 includes regulator sections 222, 224 and 226. Each of the regulator sections is identical to the regulator 25 shown in FIG. 6. A common air supply 230 supplies air to all th e regulator sections 222, 224, 226.

A control module 229 is provided to control the operation of regulator sections 222, 224, 226. Control module 229 is connected to the output pressure feedback transducers 240, 242, 244 for the respective regulator sections 222, 224, 226. Fill and vent valves 252 and 254, 262 and 264, and 272 and 274 are included in each of the respective regulator sections and these valves are controlled by electrical lines from control module 229. Control module 229 has control circuits 253, 263 and 273 for the respective regulator sections 222, 224 and 226. Each control circuit 253, 263, 273 is identical to the control circuit 38 previously described. The output pressure set point for each of the circuits 253, 263, 273 is set by adjustment of a rotating knob 255, 265, 275 which could be fixed to a potentiometer, for example, to provide adjustable control signal 128. A display, or gauge, 257, 267 and 277 is provided on the control module 229 to display the pressure output 168 for each of the transducers 240, 242, 244, respectively. Control module 229 also includes alarm lights 259, 269, 279 which are connected to the watch dog circuit 166 of each of the control circuits 253, 263, 273.

Regulator section 222 supplies air to fluidizing inlet 210 via a hose 300. Regulator section 224 supplies air to the diffuser inlet 213 of pump 202 via a hose 302. Regulator section 226 supplies air to flow air input 215 of pump 202 via a hose 304. Ideally, the hose lengths 300, 302, 304 would be kept very short to minimize pressure losses and fluctuations in the hoses. This can be accomplished by mounting regulator assembly 220 on or very close to hopper 200. In addition, ideally control module 229 is mounted directly to regulator assembly 220 to minimize wiring. Using this approach an operator can stand at the hopper and independently dial in the desired pressure set points for each of the three air supplies and the system will accurately maintain those set points by means of the circuit operation described above. In a fully automated system, the manual knobs 255, 265, 275 could be replaced with electrical inputs from an electronic controller to remotely adjust the various air pressures in the system.

It is also within the terms of the invention to supply diffusing air to gun 204 to disperse the air entrained powder delivered to the gun from pump 202, the diffusing air can also set to a desired pressure set point and regulated by an additional regular section in regulator assembly 220.

Figure 13:
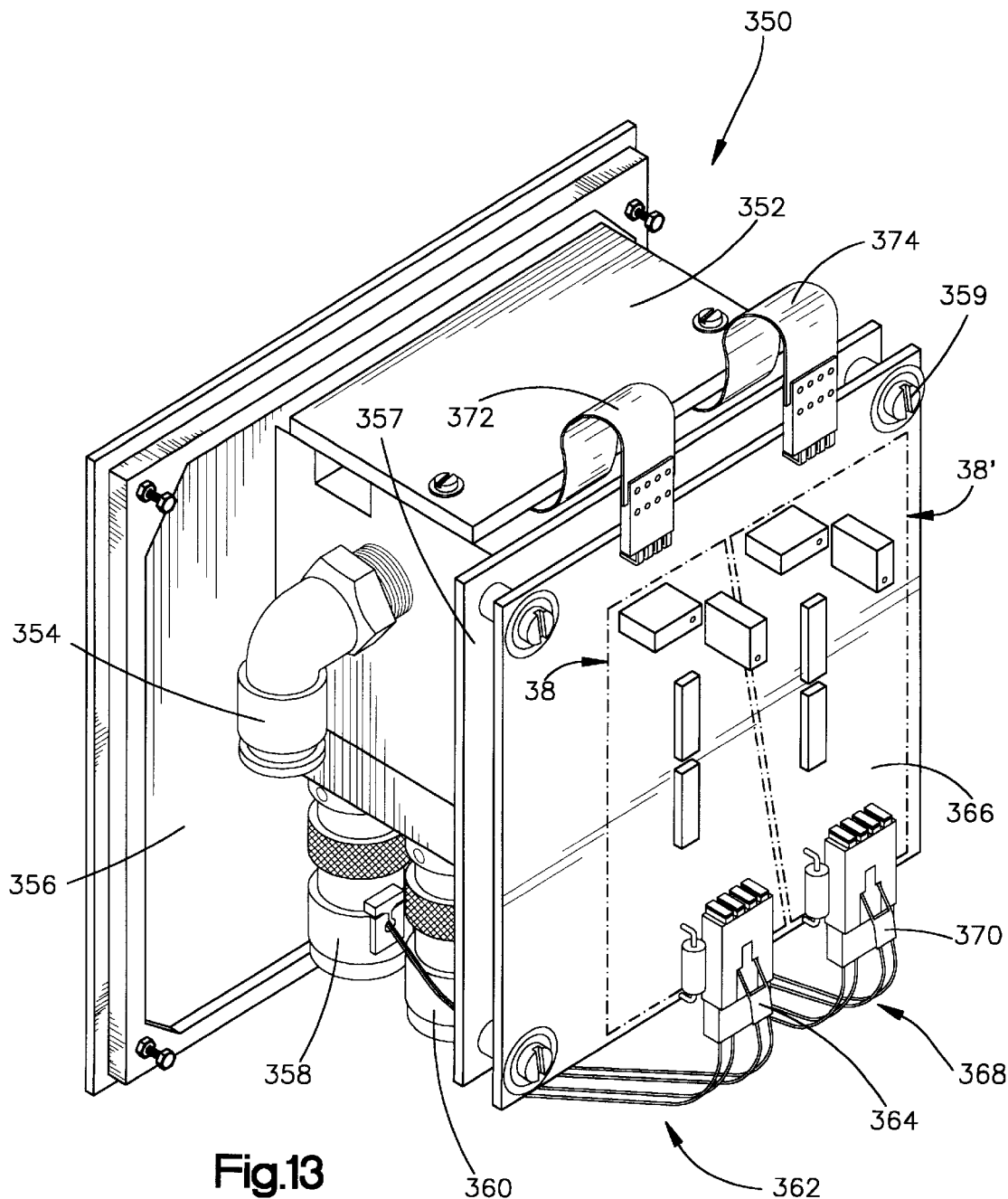
FIG. 13 shows a perspective view of the regulator shown in FIGS. 5 and 6.

FIG. 13 more clearly illustrates the very efficient manner in which the current regulator invention has been packaged. With respect to FIG. 13, a two channel regulator assembly 350 includes a housing 352 with two regulator sections, each identical to the regulator as shown in FIG. 6. The housing 252 has an air input 354 and two air outlets (not shown). Housing 352 is mounted on a bracket 356 which in turn is secured to a component, such as a hopper of a spray coating system of the type shown in FIG. 12. Four solenoid operated valves are provided, two for each regulator sections. The two illustrated solenoids 358 and 360 for the solenoid operated fill and vent valves of one regulator section are connected by wires 362 to an electrical connector 364 which is in turn connected to a control circuit 38 on circuit board 366. Circuit board 366 is mounted to housing 352 by a bracket 357 and screws 359. The other two solenoid fill and vent valves (not shown) are connected by wires 368 to an electrical connector 370 which is connected to an identical control circuit 38' on circuit board 366. The circuits 38, 38' are connected by wire ribbons 372 and 374, respectively, to the pressure transducers for each of the regulator sections.

While the previous description has discussed regulation of pressurized air, it is within the terms of the invention to substitute any desired pressurized gas.

It is apparent that there has been provided in accordance with this invention, apparatus and methods for accurately controlling an air regulator system to satisfy the objects, means and advantages set forth hereinbefore. According to the invention, the air regulator system is constructed with inexpensive, on-off servo control valves that can quickly and accurately control pneumatically operated mechanisms. Further, the system and method of operating the system provides enhanced resolution, as well as improved accuracy, setability and stability of the regulator.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A circuit which produces two pulse width modulated square waves for controlling a vent valve and a fill valve of an air regulator, comprising:

means for generating a reference signal corresponding to a desired pressure in an outlet port of said air regulator;

means for generating a feedback signal envelope in response to the pressure in said outlet port, said signal envelope having a lower value corresponding to a vent trigger threshold value and an upper value corresponding to a fill valve trigger threshold value;

means for comparing said feedback signal envelope with said reference signal for oputputting a vent trigger signal to open said vent valve whenever said reference signal is below said vent trigger threshold value; and means for comparing said feedback signal envelope with said reference signal for oputputting a fill trigger signal to open said fill valve whenever said reference signal is above said fill trigger threshold value.

2. The circuit of claim 1 wherein said reference signal is an oscillating signal and wherein the width of said feedback signal envelope is approximately equal to the amplitude of said oscillating reference signal.

3. The circuit of claim 1 wherein said feedback signal envelope is approximately equal to the amplitude of said fixed frequency oscillating signal.

4. The circuit of claim 1 including:

means for generating a fixed frequency triangular wave and means for offsetting said oscillating signal by said control signal to input an offset oscillating signal.

5. The circuit of claim 1 further including speeder circuit means to momentarily increase the response time of said fill and vent valves.

6. The circuit of claim 1 further including means to activate an alarm in response to said vent or fill trigger control system remaining on too long a period of time.

7. A circuit which produces two pulse width modulated square waves for controlling a vent valve and a fill valve of an air regulator, comprising:

a signal generator for generating a reference signal corresponding to a desired pressure in an outlet port of said air regulator;

a circuit for generating a feedback signal envelope in response to the pressure in said outlet port, said signal envelope having a lower value corresponding to a vent trigger threshold value and an upper value corresponding to a fill valve trigger threshold value;

a first comparator circuit for comparing said feedback signal envelope with said reference signal for outputting a vent trigger signal to open said vent valve whenever said reference signal is below said vent trigger threshold value; and a second comparator circuit for comparing said feedback signal envelope with said reference signal for outputting a fill trigger signal to open said fill valve whenever said reference signal is above said fill trigger threshold value.

8. The circuit of claim 7 wherein said reference signal is an oscillating reference signal with a fixed frequency and wherein the width of said feedback signal envelope is approximately equal to the amplitude of said oscillating reference signal.

9. The circuit of claim 8 wherein said feedback signal envelope is approximately equal to the amplitude of said oscillating reference signal.

10. The circuit of claim 7 including:

an oscillator for generating a fixed frequency triangular wave; and means for offsetting said oscillating reference signal by said control signal to input an offset oscillating signal.

11. The circuit of claim 7 further including a speeder circuit to momentarily increase the response time of said fill and vent valves.

12. The circuit of claim 7 further including a watch dog circuit to activate an alarm in response to said vent or fill trigger control signal remaining on too long a period of time.

* * * * *